United States Patent [19]
Kawamoto et al.

[11] Patent Number: 4,703,822

[45] Date of Patent: Nov. 3, 1987

[54] FRONT AND REAR WHEEL STEERING DEVICE FOR A VEHICLE

[75] Inventors: Yoshimichi Kawamoto; Yoshimi Furukawa; Tetsuro Hamada; Mitsuya Serizawa, all of Tochigi, Japan

[73] Assignee: Honda Giken Kogyo Kabushiki Kaisha, Tokyo, Japan

[21] Appl. No.: 844,806

[22] Filed: Mar. 27, 1986

[30] Foreign Application Priority Data

Mar. 27, 1985 [JP] Japan .................................. 60-62362

[51] Int. Cl.⁴ ......................... B62D 5/00; B62D 7/00
[52] U.S. Cl. .................................. 180/140; 180/142; 280/91
[58] Field of Search ............... 180/140, 141, 142, 143; 280/91; 180/79.1

[56] References Cited

U.S. PATENT DOCUMENTS

| 4,441,572 | 4/1984 | Ito et al. | 180/143 X |
| 4,566,710 | 1/1986 | Furukawa et al. | 180/140 X |
| 4,597,462 | 7/1986 | Sano et al. | 180/140 |
| 4,598,788 | 7/1986 | Serizawa et al. | 180/140 |
| 4,601,357 | 7/1986 | Miyoshi et al. | 180/141 X |

FOREIGN PATENT DOCUMENTS 59-26366 12/1984 Japan .................................. 180/140

Primary Examiner—John A. Pekar
Attorney, Agent, or Firm—Lyon & Lyon

[57] ABSTRACT

A front and rear wheel steering device which varies the steering angle ratio of rear wheels relative to the steering angle of front wheels in relation with vehicle speed is utilized to improve the drive response of a vehicle, as well as to improve the maneuverability of the vehicle. By varying the steering angle ratio which is a function of vehicle speed according to the running condition of the vehicle, the interference of the running condition of the vehicle upon the driving response can be reduced. The driving response may be evaluated in terms of yaw rate or lateral acceleration of the vehicle for a certain steering input. The running condition of the vehicle may comprise any combination of vehicle acceleration, friction between tires and the road surface, load acting between front wheels and the road surface, and load acting between rear wheels and the road surface.

7 Claims, 4 Drawing Figures

FRONT AND REAR WHEEL STEERING DEVICE FOR A VEHICLE

BACKGROUND OF THE INVENTION

This invention relates to a front and rear wheel steering device for variably controlling the steering angle of rear wheels relative to the steering angle of front wheels.

The present inventors have previously proposed a steering device for a vehicle which steers the rear wheels in relation with the steering of the front wheels according to vehicle speed in copending U.S. patent application Ser. Nos. 822,000, 822,293, 821,998, 822,008, 822,010 and 822,043 which were filed on Jan. 24, 1986, and assigned to the same assignee. According to these devices, rear wheels are generally steered in the same phase relationship or none at all in high speed range and are steered in the opposite phase relationship in low speed range. If desired, the mathematical function of the vehicle speed for the steering angle of the rear wheels can be modified according to the vehicle acceleration or manually, or can even be manually fixed.

As a result, the minimum angle of turning and the inner radius difference of the vehicle are both drastically reduced and the maneuverability of the vehicle, particularly in low speed range, in driving the vehicle into a garage, driving the car through narrow and crooked alleys and making a U-turn, is substantially improved with the additional advantage of improving the dynamic lateral response of the vehicle in high speed range, for instance in changing driving lanes.

Generally speaking, since the driveability of a vehicle depends on the vertical load acting between the tires and the road surface, the friction coefficient of the road surface, the pneumatic pressure of the tires, the kind of the tires and so on, and the relationship of the steering angle and/or the vehicle speed on the yaw rate is generally non-linear, it is extremely difficult to evaluate the driveability of a vehicle in design stage. On the other hand, if the rear wheels are steered in addition to the front wheels, a controllable variable is added to the system and it may be possible to better evaluate or control the driveability of the vehicle by changing the steering angle ratio of the rear wheels relative to the front wheels. Based upon such a recognition of the inventors, a primary object of the present invention is to provide a front and rear wheel steering device for vehicle which can improve the driveability of the vehicle by appropriately controlling the steering angle ratio of the rear wheels relative to the front wheels.

BRIEF SUMMARY OF THE INVENTION

Based upon such a recognition, a primary object of the present invention is to provide a front and rear wheel steering device for vehicle which can improve the controllability of a vehicle.

Another object of the present invention is to provide a device for controlling the driveability of a vehicle in such a manner that the driver can experience a substantially uniform driveability from the vehicle irrespective of the running condition of the vehicle.

According to this invention, such objects are accomplished by providing a front and rear wheel steering device for vehicle for variably controlling the steering angle ratio of rear wheels relative to the steering angle of front wheels in relation with vehicle speed, comprising: a sensor means for detecting the changes in the running condition of a vehicle; and a means for varying the steering angle ratio of the rear wheels relative to the front wheels as a function of the output of the sensor means.

Thus, by detecting the running condition of the vehicle and varying the property of the steering angle ratio function accordingly to produce a desired driveability, the driver can obtain a uniform driveability irrespective of the driving condition of the vehicle and, through accurate prediction of the behavior of the vehicle, the driving of the vehicle may be made less tiring and more comfortable.

The running conditions of the vehicle may include the static or dynamic load acting between the wheels and the road surface, the frictional coefficient between the tires and the road surface, and the vehicle acceleration, among other factors.

According to a certain aspect of the present invention, the steering angle ratio of the rear wheels relative to the front wheels is varied so as to obtain a substantially constant driving response. The driving response may be evaluated in terms of the yaw rate or the lateral acceleration of the vehicle for a certain steering input.

Thereby, the driver can always expect a substantially same driving response for a certain steering input at a certain vehicle speed irrespective of the running condition of the vehicle, and the driveability of the vehicle will be improved.

BRIEF DESCRIPTION OF THE DRAWINGS

Now embodiments of this invention are described in the following with reference to the appended drawings, in which.

DETAILED DESCRIPTION OF THE PREFERRED EMBODIMENTS

Figure 1:
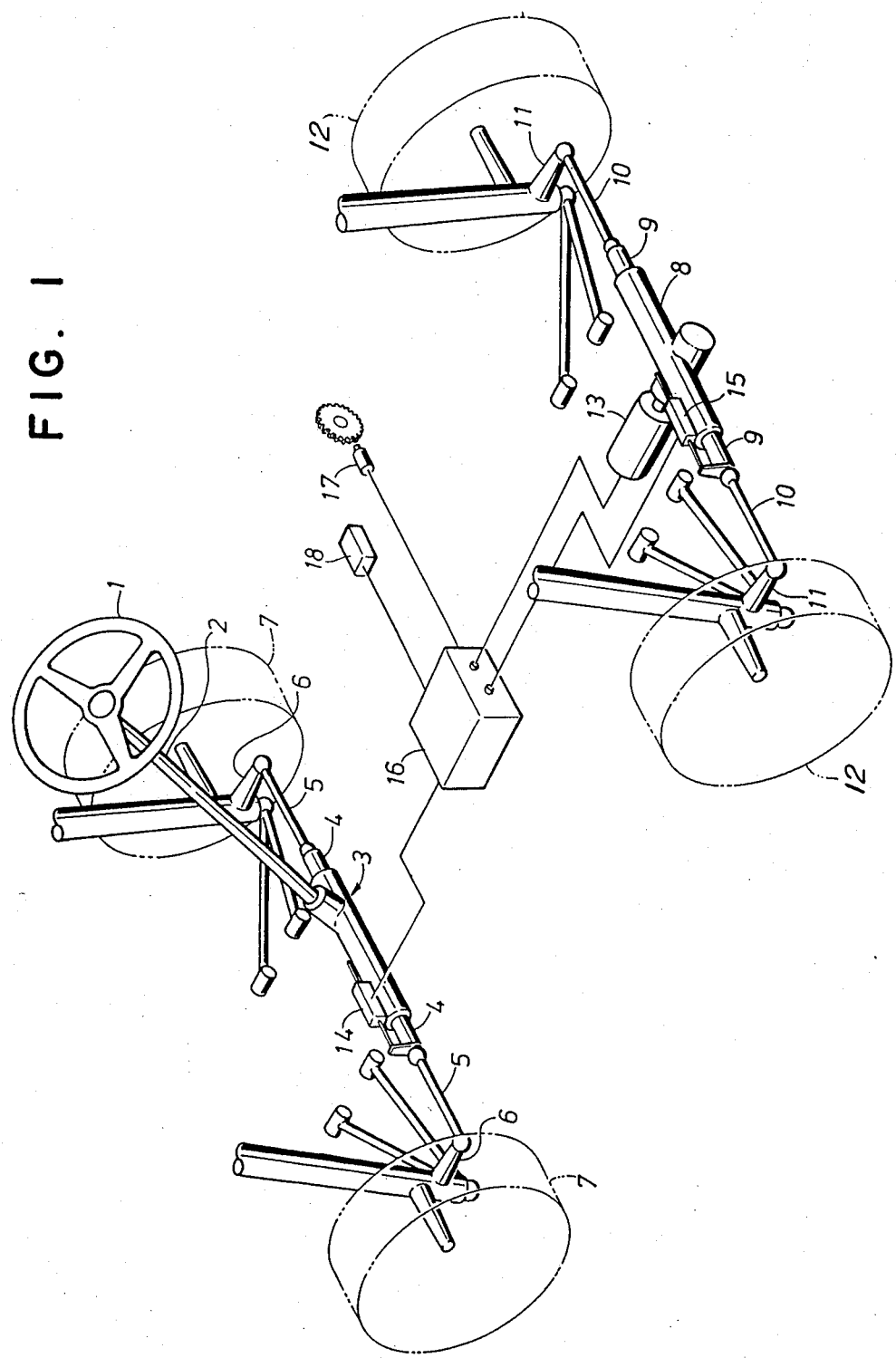
FIG. 1 is a perspective view showing the general basic structure of a vehicle provided with a front and rear wheel steering device to which this invention is applied.

FIG. 1 shows an embodiment of the structure of the front and rear wheel steering device to which this invention is applied. A steering column shaft 2 of a steering wheel 1 is joined into a rack and pinion type gear box 3, and a pair of tie rods 5 are connected to the two ends of a rack shaft 4. To the external ends of the tie rods 5 are connected a pair of knuckle arms 6 which support front wheels 7, respectively, in such a manner that the front wheels 7 can be steered to the direction determined by the steering wheel 1 in the known manner.

As for the rear wheels, a rack and pinion gear type gear box 8 is laterally arranged in the same manner as that for the front wheels, and tie rods 10 are connected to the two ends of the rack shaft 9 of the gear box 8. And the external ends of the tie rods 10 are connected to knuckle arms 11 which in turn support the rear wheels 12. The pinion shaft of the gear box 8 is connected to an output shaft of a motor 13. Thus, the rear wheels 12 are steered by the power from the motor 13.

A pair of displacement sensors 14 and 15, which for instance may be made of potentiometers or differential transformers, are arranged between the casings of the gear boxes 3 and 8 the rack shafts 4 and 9 for the front and the rear wheels, respectively, so that the displacements of the rack shafts 4 and 9 may be detected as quantities representative of the actual steering angles. The outputs of these displacement sensors 14 and 15 are connected to a control device 16. Further, the output of a vehicle speed sensor 17 provided on the non-driven wheels, for instance, and the output of a running condition sensor 18 which may consist of a load sensor for detecting the load on the rear wheels are also connected to the control device 16.

When a load sensor is to be used as the running condition sensor 18, the load may be obtained as a static load which can be obtained either by averaging the deflection of the suspension springs for the rear wheels or by combining the vertical acceleration of the rear part of the vehicle, the vertical velocity of the rear part of the vehicle obtained by integrating the acceleration and the deflection of the suspension springs for the rear wheels.

The control device 16 is internally equipped with a computer 19 (FIG. 2) which controls the rotation of the motor 13 by supplying thereto an appropriate actuation signal corresponding to the vehicle speed based on the signals supplied from the steering angle sensors 14 and 15 for detecting the steering angles of the front and the rear wheels and the vehicle speed sensor 17 for detecting the vehicle speed, by way of an output device 20.

Now the action of the above-described embodiment will be described in the following with reference to FIGS. 2 and 3.

Figure 2:
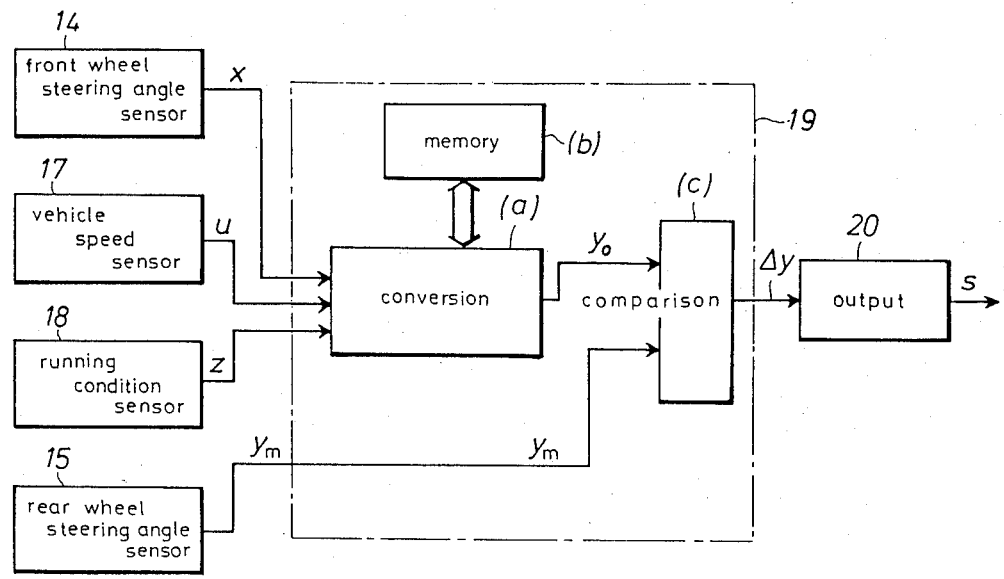
FIG. 2 is a functional block diagram of the computer which is mounted to the vehicle.

FIG. 2 shows the functional structure of the computer 19. The steering angle of the front wheels detected by the steering angle sensor 14 is supplied to the computer 19 as a front wheel steering angle signal x and the vehicle speed signal detected by the vehicle speed sensor 17 is also supplied to the computer 19 as a certain vehicle speed signal u.

Since the cornering power of the rear wheels is generally dependent on the load of the rear wheels, even when the vehicle speed is the same and the steering angles of the rear and the front wheels are the same, the yaw rate of the vehicle is not necessarily the same. Therefore, the driver must adjust the steering angle accordingly but it imposes a certain burden on the driver. Therefore, according to the present embodiment, the mathematical function which determines the steering angle ratio of the rear wheels is varied according to the change in the load of the rear wheels. To such an end, the running condition signal z from the running condition sensor 18 is supplied to the computer 19.

In a conversion process (a), one of a plurality of mathematical functions $f = f_1, f_2, \ldots$ stored in the memory (b) is selected according to the running condition signal z, and the target value $y_0$ of the steering angle of the rear wheels is given in relation with the actual steering angle x obtained from the steering angle sensor 14 for the front wheels as follows:

$$y_0 = xf(u)$$

This can be conveniently implemented by a map control in which the value of the function $f(u)$ is determined from a matrix of various values of u and z.

Meanwhile, the detection result of the steering angle sensor 15 for the rear wheels is inputted to the comparison process (c) in the computer 19 as a rear wheel actual steering angle data $y_m$. Based upon the rear wheel actual steering angle data $y_m$ and the target value $y_0$ for the steering angle of the rear wheels, a relative difference delta $y = y_m - y_0$ is obtained in the comparison process (c). This difference delta y is inputted from the computer 19 to the output control device 20 as data corresponding to the correction of the steering angle which is necessary to achieve the necessary steering angle of the rear wheels. The output end of this output control device 20 is connected to the motor 13 and supplies thereto a control signal s corresponding to the difference delta y. And the motor 13 is driven in the direction which accomplishes the steering angle of the rear wheels which corresponds to the current speed and running condition of the vehicle.

Figure 3:
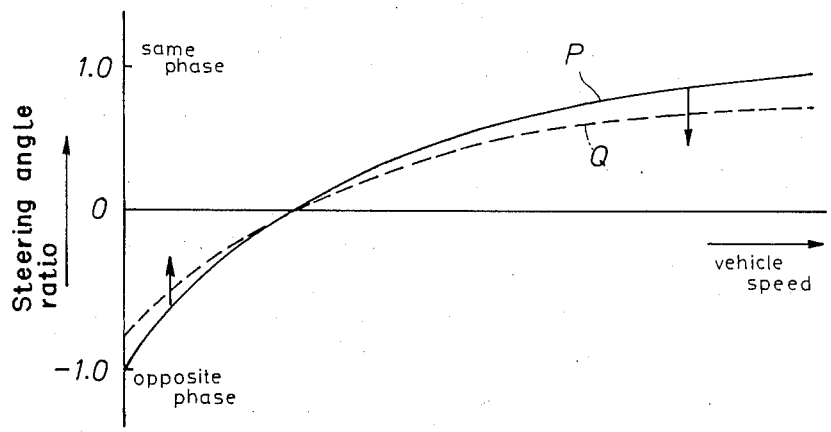
FIG. 3 is a steering angle ratio property graph of the above mentioned embodiment.

Thus, if the mathematical function f representing the steering angle ratio of the rear wheels is as indicated by a curve P in FIG. 3, as the load on the rear wheels increases, the cornering power of the rear wheels increases and the yaw rate accordingly increases. Therefore, according to the present embodiment, if the load on the rear wheels increases, the mathematical function representing the steering angle ratio of the rear wheels is modified, for instance, as indicated by a curve Q shown in FIG. 3 according to the output from the running condition sensor 18, and the absolute value of the steering angle ratio of the rear wheels is reduced. As a result, the driver can always obtain a yaw rate which corresponds to the steering input and the burden on him is reduced by the elimination of the need for him to adjust the steering input according to the changes in the running condition of the vehicle.

In the above described embodiment, a sensor for detecting the load on the rear wheels was used as the running condition sensor 18, but it is also possible, alternatively or additionally, to detect the friction coefficient of the road surface and vary the mathematical function for the steering angle ratio of the rear wheels according to the detected friction coefficient. As methods for detecting the friction coefficient of the road surface, various methods are possible; for instance it is possible to find the friction coefficient by actually dragging an object and measuring its frictional force, by frequency analyzing the sound from the tires, or by projecting light upon the road surface and evaluating the reflection of the light from the road surface.

Figure 4:
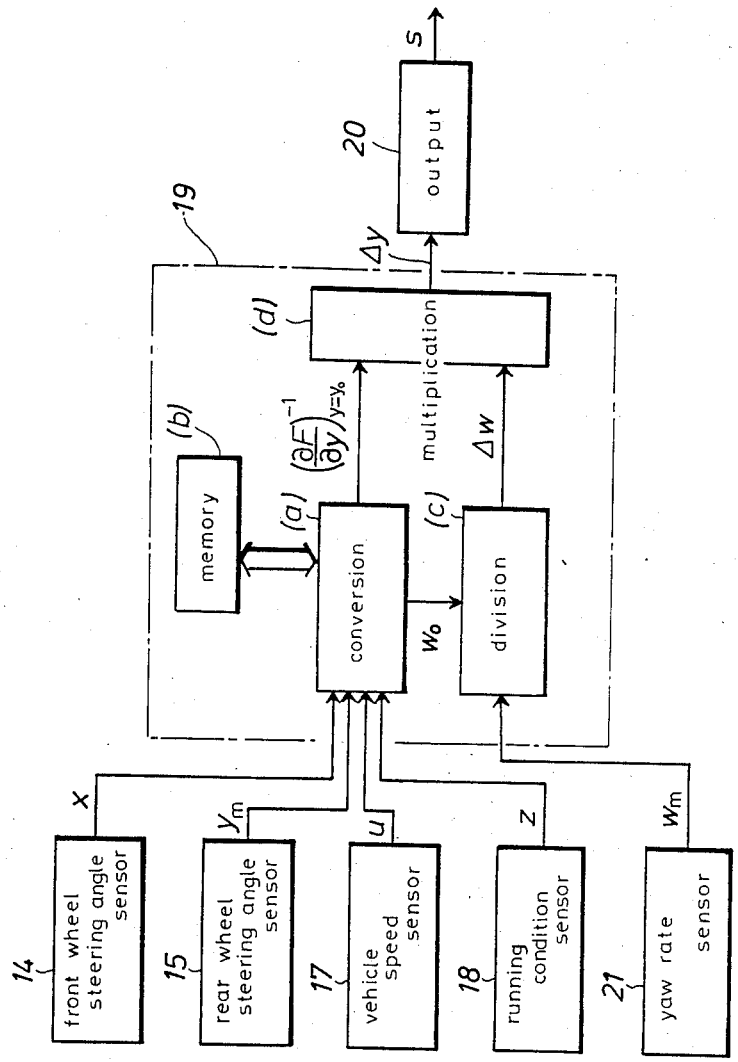
FIG. 4 is a functional block diagram of the computer which is mounted to the vehicle according to the second embodiment of the present invention.

Generally, the yaw rate or the lateral acceleration of the vehicle for a certain steering input is selected as an object for evaluating the driveability of a vehicle. Therefore, by detecting the yaw rate and so on and controlling the steering angle ratio of the rear wheels according to such detection results, even more accurate control of the driveability of the vehicle becomes possible. FIG. 4 is a functional block diagram of another embodiment of the control device for the front and rear wheel steering device based upon such a recognition.

The outputs x, $y_m$, u and z of the front wheel steering angle sensor 14, the rear wheel steering angle sensor 15 and the vehicle speed sensor 17 and the running condition sensor 19 are inputted to a computation process (a). The memory (b) internally provided in a computer 19 stores a mathematical function $w_0 = F(x, y_m, u, z)$ which gives a target yaw rate $w_0$ of the vehicle for each combination of the front wheel steering angle signal x, the vehicle speed signal u, the running condition signal z and the target rear wheel steering angle $y_0$. The target steering angle $y_0$ of the rear wheels is uniquely determined by the front wheel steering angle signal x, the vehicle speed signal u, and the running condition signal z, but it is desirable to monitor if the control error is within a certain range or not by comparing the target steering angle $y_0$ of the rear wheels with the output $y_m$ from the rear wheel steering angel sensor 15 at all time to ensure control stability.

In the computation process (a), the yaw rate $w_0$ which is to be considered as the target value is computed according to the detection results from the various sensors, and the increment of the yaw rate delta $w = w_m - w_0$ for a certain increment of the rear wheel steering angle delta $y = y_m - y_0$, or the sensitivity coefficient $$\left(\frac{\partial F}{\partial y}\right)_{y=y_0}$$

of the yaw rate relative to the changes in the steering angle of the rear wheels is computed in a certain cycle, and the inverse of the sensitivity coefficient $$\left(\frac{\partial F}{\partial y}\right)^{-1}_{y=y_0}$$

and the target yaw rate $w_0$ is outputted. Here, $w_m$ denotes the actual yaw rate obtained from the yaw rate sensor 21. As a yaw rate sensor 21, a rate gyro, for instance, placed in the center of the vehicle may be used.

The target yaw rate $w_0$ is converted into the increment delta w by a division process (c) as a ratio between the target yaw rate $w_0$ computed in the computation process (a) and the actually measured yaw rate $w_m$. Further, in a multiplication process (d), the increment delta w is multiplied to the inverse of the sensitivity coefficient to obtain $$\Delta y = \left(\frac{\partial F}{\partial y}\right)^{-1}_{y=y_0} \cdot \Delta w$$

and the correction delta $y = y_m - y_0$ required for bringing the measured yaw rate $w_m$ close to the target yaw rate $w_0$. The output device 20 supplies a drive signal s to the motor 13 to steer the rear wheels 12 by delta y.

In this embodiment, it is also possible to use the lateral acceleration instead of the yaw rate as an object for evaluating the driveability of the vehicle. Further, the variables representing the running condition of the vehicle may include the dynamic load on the rear wheels, the frictional coefficient of the road surface, the vehicle acceleration, but the number of such variables should be reduced insofar as control stability is assured.

In the above described embodiments, there might be a chance that control stability is lost if the change in the running condition of the vehicle is too sudden. Since such an occurrence means that the driving condition is too severe, it is preferable to fix the steering angle ratio function to a stable one and to issue an alarm at the same time so as to warn the driver to ease the driving condition.

In the above-described embodiments, the various processes conducted in the computer 19 are executed by a certain program (software) stored for instance in a storage area of the computer 19, but it is possible to utilize electric circuitry having a similar functionality to perform the same processes.

Further, this invention is not limited by the above-described embodiments, but may also be applied to other front and rear wheel steering devices in which the rear wheels are hydraulically controlled, the front steering angle information is transmitted by hydraulic pressure, or a mechanical structure for varying the steering angle ratio is provided on the rear wheels so that the rear wheels may be steered by rotational force which is mechanically transmitted from the front wheels.

Thus, according to this invention, since the steering angle of the rear wheels is controlled according to the running condition of the vehicle, a constant driveability can be obtained irrespective of the running condition of the vehicle. Therefore, it is possible to obtain a favorable and safe driveability which is not affected by the running condition of the vehicle while maintaining the advantages of a front and rear wheel steering device.

What we claim is:

1. A front and rear wheel steering device for a vehicle for variably controlling the steering angle ratio of rear wheels relative to the steering angle of front wheels as a certain mathematical function of vehicle speed, comprising:
   a sensor means for detecting the changes in a factor which affects the cornering power of certain ones of the front and rear wheels;
   and a control means for varying the mathematical function so as to maintain a lateral response of the vehicle in relation with the vehicle speed substantially constant irrespective of the changes in the factor.

2. A front and rear wheel steering device for vehicle as defined in claim 1, wherein said factor comprises any combination of vehicle acceleration, friction between tires and the road surface, load acting between front wheels and the road surface, and load acting between rear wheels and the road surface.

3. A front and rear wheel steering device for vehicle as defined in claim 1 or 2, wherein said lateral response is evaluated in terms of the yaw rate of the vehicle for a certain steering input.

4. A front and rear wheel steering device for vehicle as defined in claim 1 or 2, wherein said lateral response is evaluated in terms of the lateral acceleration of the vehicle for a certain steering input.

5. A front and rear wheel steering device for vehicle as defined in claim 1 or 2, further comprising a warning means for issuing a warning when said factor has exceeded a certain limit.

6. A front and rear wheel steering device for vehicle as defined in claim 1 or 2, further comprising a means for terminating the normal operating action of the control means and selecting, instead, a steering angle ratio which will give rise to a stable vehicle response when the factor has exceeded a certain limit.

7. A front and rear wheels steering device for a vehicle as defined in claims 1 or 2, wherein the lateral response of the vehicle in relation with the vehicle speed is maintained substantially constant by adjusting the steering ratio of the rear wheels relative to the front wheels according to an inverse of a current sensitivity coefficient which is evaluated from the actual lateral response of the vehicle.

* * * * *